(12) United States Patent
Binder et al.

(10) Patent No.: US 7,866,516 B2
(45) Date of Patent: Jan. 11, 2011

(54) ROOF RACK FOR A VEHICLE

(75) Inventors: Hans Binder, Böhmenkirch (DE); Ottmar Binder, Böhmenkirch (DE)

(73) Assignee: Hans und Ottmar Binder GmbH Oberflachenveredelung (DE)

( * ) Notice: Subject to any disclaimer, the term of this patent is extended or adjusted under 35 U.S.C. 154(b) by 338 days.

(21) Appl. No.: 10/575,654

(22) PCT Filed: Sep. 17, 2004

(86) PCT No.: PCT/EP2004/010455

§ 371 (c)(1), (2), (4) Date: Apr. 14, 2006

(87) PCT Pub. No.: WO2005/049379

PCT Pub. Date: Jun. 2, 2005

(65) Prior Publication Data

US 2007/0138221 A1   Jun. 21, 2007

(30) Foreign Application Priority Data

Oct. 24, 2003   (DE) .............................. 103 50 288

(51) Int. Cl.
  *B60R 9/04*   (2006.01)
  *B60R 9/042*  (2006.01)
  *B60R 9/00*   (2006.01)
(52) U.S. Cl. .................. 224/322; 224/309; 224/326; 224/310; 224/321
(58) Field of Classification Search ................. 224/322, 224/321, 309, 326
See application file for complete search history.

(56) References Cited

U.S. PATENT DOCUMENTS

| 4,277,009 | A | * | 7/1981 | Bott ............................ 224/309 |
| 5,069,377 | A |   | 12/1991 | Baughman |
| 5,893,499 | A | * | 4/1999 | Lumpe et al. ................ 224/309 |
| 6,126,051 | A |   | 10/2000 | Potter |
| 6,592,176 | B2 |  | 7/2003 | Lumpe et al. |
| 7,204,396 | B1 | * | 4/2007 | Stapleton ..................... 224/326 |

FOREIGN PATENT DOCUMENTS

| DE | 29 46 533 A1 | 5/1981 |
| DE | 43 41 619 C1 | 1/1995 |
| DE | 44 22 421 C1 | 9/1995 |
| DE | 297 00 637 U1 | 2/1997 |
| EP | 1 059 204 A | 12/2000 |

\* cited by examiner

*Primary Examiner*—Nathan J Newhouse
*Assistant Examiner*—Lester L Vanterpool
(74) *Attorney, Agent, or Firm*—Bateman IP Law Group

(57) ABSTRACT

The invention relates to a roof rack (1) for a vehicle having at least one tubular rail (2) extending essentially at a distance from the roof of the vehicle and at least two supports (5) at the ends of the rail to attach the roof rack (1) to the vehicle roof, where the rail (2) is shaped in its end areas (3) to have a curve (4) and in the area of each curve (4) is held from below by the support (5) which can be attached to the rail (2), the underside (11) of said support—when viewed in cross-section—forming a flat supporting surface (12) for a matching surface (13) on the rail (2).

21 Claims, 2 Drawing Sheets

ROOF RACK FOR A VEHICLE

Figure 1:
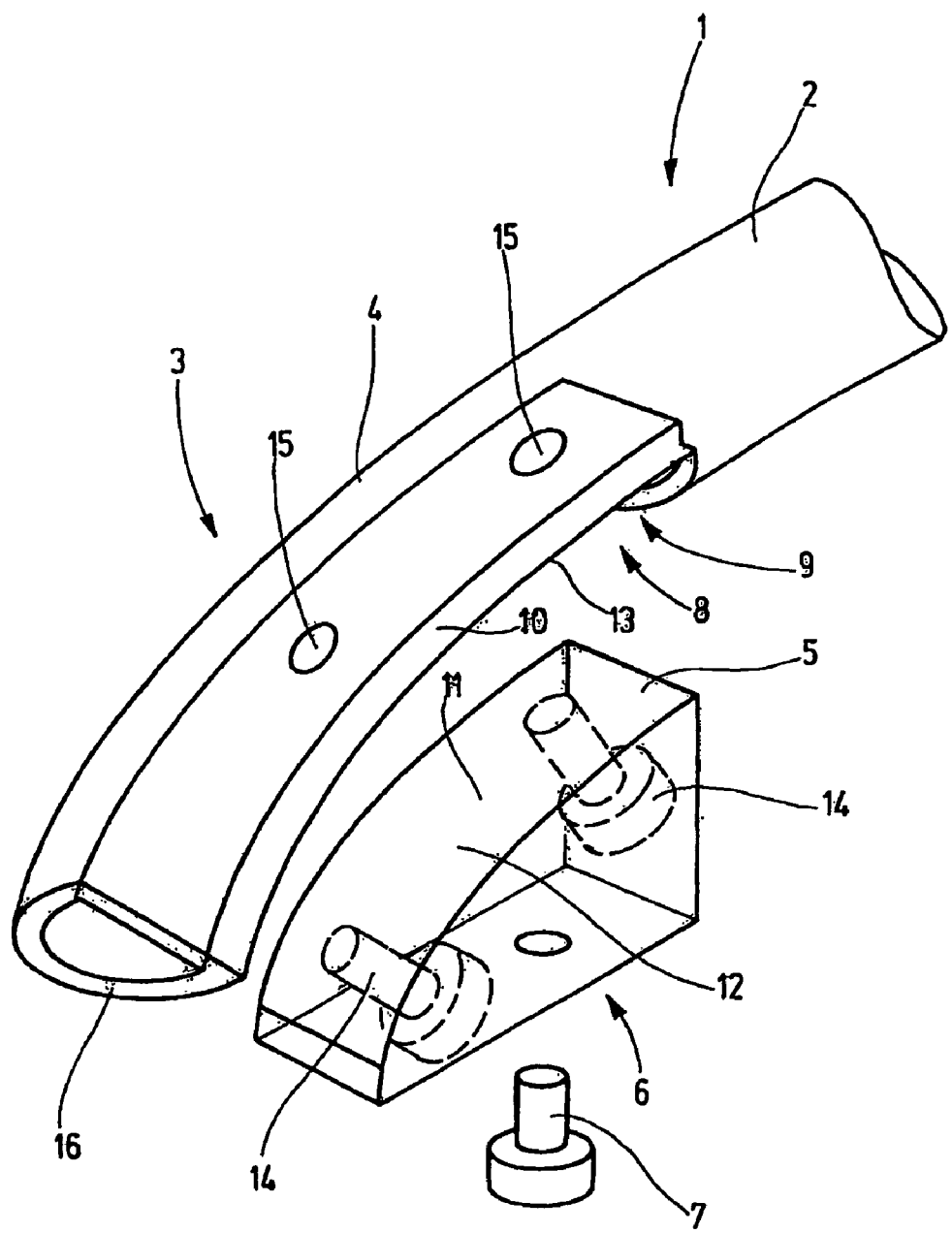

The invention relates to a roof rack for a vehicle having at least one tubular rail extending essentially at a distance from the roof surface and two supports at the ends of the rails to attach the roof rack to the vehicle roof.

It is known to construct a roof rack for vehicles from one rail on each side of the roof. Each rail has supporting feet in its end areas which in turn can be anchored to the vehicle.

The object of the invention is to create a simple roof rack with a high load capacity.

To achieve this objective, it is proposed under the invention that the rail is configured to have a curve in its end areas and in the area of each curve it is held from below by a support attached to the rail whose upper side—when viewed in cross-section—forms a flat supporting surface for a matching surface on the rail. In particular the intention is that the matching surface—when viewed in cross-section—also has a flat configuration.

When viewed in a longitudinal section, the upper side of the support runs preferably in an arcuate shape, specifically in a convex curve. A corresponding shape is preferably provided for the matching surface, i.e. when viewed in longitudinal section it has a similarly arcuate shape, in particular a concave curve.

Provision can be preferably made for the support to have a retaining projection which engages the inside of the tubular rail, specifically the end face of the tubular rail. The cross-sectional profile of the retaining projection can preferably be configured to match the shape of the interior cross-sectional profile of the tubular rail. In this way it is possible to absorb twisting forces acting on the rail without difficulty and further to transfer forces occurring in the longitudinal direction of the roof rack directly into the corresponding support.

It is particularly advantageous if the rail has a step which is held from behind by a section of the support in the area transitioning from a zone assigned to one of the supports to a zone without a support. This rear attachment provides additional support for the rail in the longitudinal direction and thus contributes to the strength of the roof rack.

The intention is specifically that the support is bolted to the rail by means of at least one threaded bolt, wherein the head of the threaded bolt lies in an attachment for the support. The attachment ensures that the bolt head is recessed. The support is attached to the vehicle roof by means of at least one attaching means configured as a bolt. To achieve this, the bolt is screwed into a threaded hole on the support, passing through a mounting structure on the vehicle roof and in this way creating a strong seat.

Preferably the intention is that the support is made up of at least two parts, a mounting plate and a retaining element with the matching surface.

The retaining plate is further formed in one piece with the retaining projection or the latter is attached to the mounting plate.

The drawings explain the invention using two embodiments as a reference.

Figure 2:
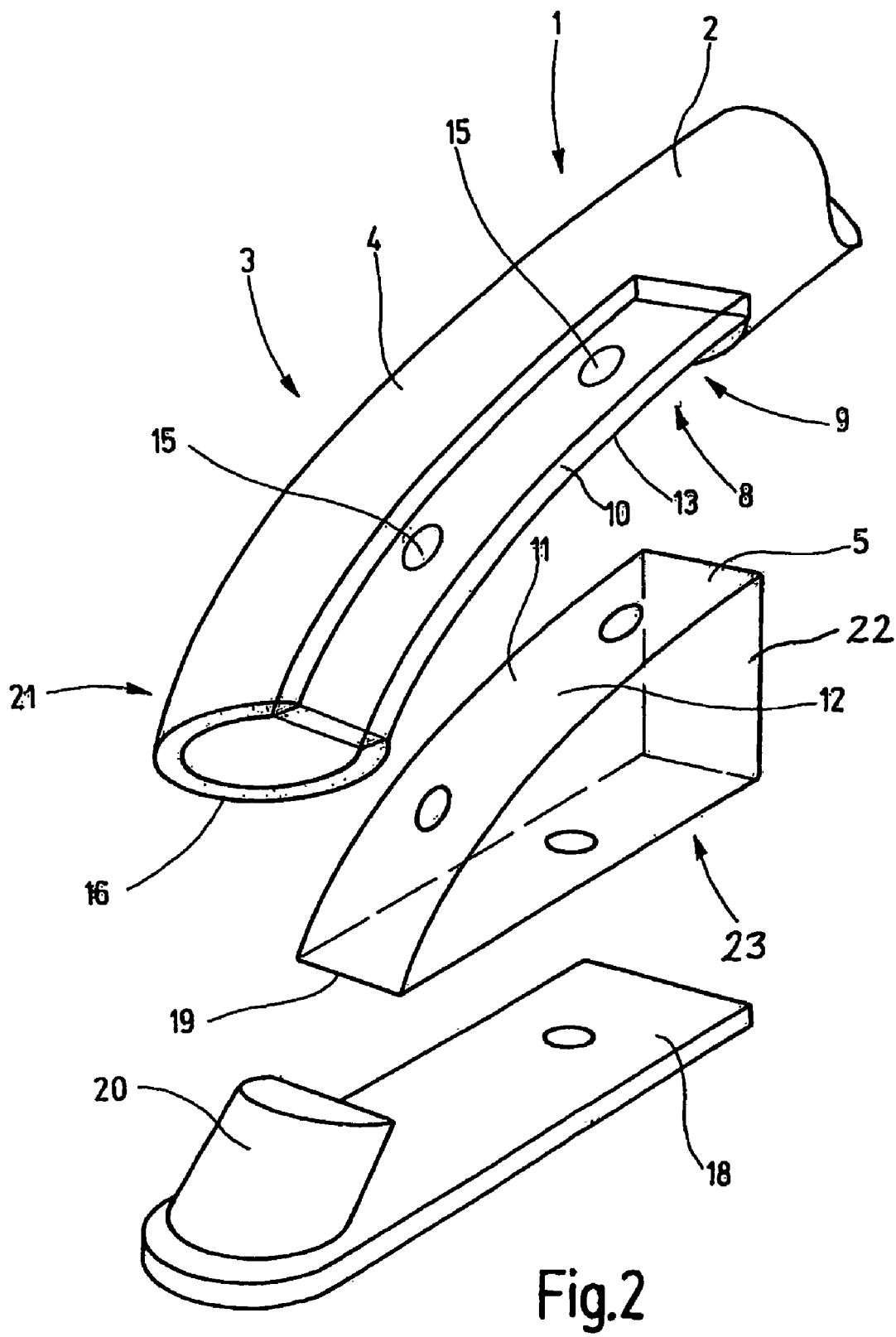

FIG. 1 shows an exploded perspective drawing of a roof rack in the area of its end with a support and FIG. 2 shows a drawing similar to FIG. 1 of a further embodiment of a roof rack.

FIG. 1 shows a part of a roof rack 1, where only one end area is shown, which can be attached to a vehicle which is not shown. The other opposite end area of the roof rack 1 is shaped in a similar fashion so that it is sufficient to describe only one end area in what follows. The roof rack 1 has a tubular rail 2, preferably configured as a hollow profile, extending essentially at a distance from the vehicle's roof surface. To produce the complete roof rack, two such rails are provided which are attached in the two lateral areas of the vehicle's roof. To attach the rails 2, they exhibit a curve 4 at each end area 3 toward the vehicle roof, which is not shown. In the area of the curve 4, the roof rack 1 has a support 5, whose underside 6 can be attached to the vehicle with suitable attaching means 7.

In the area of the curve 4 an indentation is provided in the form of a step 9, i.e. the underside of the rail is recessed to locate the support 5. Since the rail 2 is preferably configured as a hollow profile, a corresponding interior area of the hollow profile is filled with material during manufacture and the step 9 is then machined so that the contact area of the rail 2 is configured to the support 5 as a supporting wall 10.

From FIG. 1 it can be seen that the top side 11 of the support 5 coacting with the supporting wall 10 is flat—when viewed in cross-section—thus forming a flat supporting surface 12. Viewed in longitudinal section, the top side 11 has a convexly curved shape, i.e. the supporting surface 12—when viewed in the direction of the longitudinal section—is configured with a convex curvature. The matching surface 13 on the underside 9 of the rail 2 coacting with the supporting surface 12 is shaped to match the supporting surface 12, i.e. it is flat when viewed in cross-section and has a concave curvature when viewed in longitudinal section, so that supporting surface 12 and the matching surface 13 make essentially full contact over their entire surfaces. To attach the support 5, matching mounting holes not shown in detail (see FIG. 2) are provided in the support 5, into which threaded bolts 14 are inserted which are tightened in a mating counter thread 15 on the rail 2. The heads of the threaded bolts 14 are recessed in the support 5.

The layout is constructed such that in the assembled state the end face 16 of the rail 2 lies approximately on the level of the underside 6 of the support 5 so that the downward curve 4 of the rail 2 covers the support 5 almost completely in its arc.

To mask the support 5 and the rail 2 from the side, suitable thin-walled trim pieces, not shown, can be provided which are attached with suitable fasteners or which can be snapped into place.

FIG. 2 shows a further embodiment of a roof rack 1, wherein only the differences from the embodiment from FIG. 1 will be discussed in what follows. Otherwise the explanations given for the embodiment from FIG. 1 apply equally to the embodiment from FIG. 2. The support 5 has a mounting plate 18 and a retaining element 22. In the installed position, the underside 23 of the retaining element 22 lies on a mounting plate 18 which extends beyond the endmost edge 19 of the retaining element 22 and which has a retaining projection 20 in this area with a cross-sectional profile which matches the interior cross-sectional profile of the tubular rail 2 in the area of its end 21. In the assembled state, the retaining projection 20 of the support 5 engages the end face 16 in the interior of the tubular rail 2. The identically matching cross-sectional profiles prevent any twisting and the flat cross-section and the curved longitudinal section combine to form a seat between support 5 and underside 8 of the rail 2 to create a joint which is simple in its shape but has a high-load capacity.

What is claimed is:

1. A roof rack for a vehicle, having at least one rail extending essentially at a distance from the roof surface of the vehicle and at least two supports at the ends of the rail to attach the roof rack to the vehicle roof, wherein the rail is defined by an elongate body having exterior walls extending along the length of the rail and end faces extending across the elongate body; wherein an elongate longitudinal section of the rail adjacent an end face is curved so as to form a curved section, the curved section being formed apart from the end face and being formed by an exterior surface of said exterior walls of the rail; and wherein the curved section of the rail is held from below by the support such that the support attaches to the curved section of the rail via the exterior wall and independent of the end face and such that the support is displaced longitudinally along the rail from the end face, wherein the top surface of the support, when viewed in cross-section, forms a flat supporting surface for a matching surface on the rail, wherein the matching surface of the rail is flat when viewed in cross-section, and wherein said matching surface comprises a recess formed in the underside of the rail in the area of the curve to receive the support.

2. The roof rack of claim 1, wherein the rail is tubular and wherein the roof rack further comprises a projection which extends into the end of the rail, wherein the projection has a shape which corresponds to the interior of the rail so as to extend into the interior of the rail and engage an interior surface of said exterior walls of the rail.

3. The roof rack of claim 2, wherein the roof rack further comprises a mounting plate, and wherein the projection extends upwardly from the mounting plate.

4. The roof rack of claim 3, wherein the mounting plate attaches to the bottom of the support and wherein the end face of the rail is disposed adjacent the mounting plate.

5. A roof rack for a vehicle comprising:
a rail extending at a distance from the roof of a vehicle, the rail having an elongate body and having exterior walls disposed along the length of the rail and an end face disposed across the elongate body, the end face being directed towards the roof of said vehicle;
a curved section of the rail, the curved section comprising an elongate longitudinal section of the rail which is adjacent the end of the rail and separate from the end face of the rail, the curved section being defined by an exterior surface of said exterior walls of the rail; and
a support attached to the curved section of the rail via the exterior walls and configured for attaching the rail to the roof of a vehicle at a position apart from the end face of the rail, the support having an upper surface which is curved so as to be complementary to the lower surface of the curved section of the rail, and wherein the rail has a recess formed in the underside of the exterior wall of the curved section of the rail and wherein the support is disposed in the recess.

6. The roof rack of claim 5, wherein the support is generally flat on the bottom and configured for attachment to the roof of a vehicle.

7. A roof rack for a vehicle comprising:
a rail extending at a distance from the roof of a vehicle, the rail having an elongate body and having exterior walls disposed along the length of the rail and an end face disposed across the elongate body, the end face being directed towards the roof of said vehicle;
a curved section of the rail, the curved section comprising an elongate longitudinal section of the rail which is adjacent the end of the rail and separate from the end face of the rail, the curved section being defined by an exterior surface of said exterior walls of the rail; and
a support attached to the curved section of the rail via the exterior walls and configured for attaching the rail to the roof of a vehicle at a position apart from the end face of the rail, the support having an upper surface which is curved so as to be complementary to the lower surface of the curved section of the rail, and wherein the bottom of the curved section and the top of the support are flat when viewed in a cross-section taken laterally across the rail.

8. The roof rack of claim 5, wherein the rail is tubular so as to have a hollow interior, and wherein the roof rack comprises a projection which is complementary in shape to the hollow interior of the rail and which is disposed in the hollow interior of the tubular rail so as to engage the interior surface of said rail exterior walls.

9. The roof rack of claim 8, further comprising a mounting plate attached to the bottom of the support, and wherein the projection is disposed on the mounting plate.

10. The roof rack of claim 5, wherein the bottom of the curved portion and the top of the support have a curved shape in longitudinal cross-section.

11. A roof rack for a vehicle comprising:
a rail extending at a distance from the roof of a vehicle, the rail having an elongate body and having exterior walls disposed along the length of the rail and an end face disposed across the elongate body, the end face being directed towards the roof of said vehicle;
a curved section of the rail, the curved section comprising an elongate longitudinal section of the rail which is adjacent the end of the rail and separate from the end face of the rail, the curved section being defined by an exterior surface of said exterior walls of the rail; and
a support attached to the curved section of the rail via the exterior walls and configured for attaching the rail to the roof of a vehicle at a position apart from the end face of the rail, the support having an upper surface which is curved so as to be complementary to the lower surface of the curved section of the rail, and wherein the rail has a step formed on the underside and wherein the support is disposed adjacent the step such that the step locates the support.

12. A roof rack for a vehicle comprising:
a rail extending at a distance from the roof of a vehicle, the rail having an elongate body and having exterior walls disposed along the length of the rail and an end face disposed across the elongate body, the end face being directed towards the roof of said vehicle;
a curved section of the rail, the curved section comprising an elongate longitudinal section of the rail which is adjacent the end of the rail and separate from the end face of the rail, the curved section being defined by an exterior surface of said exterior walls of the rail; and
a support attached to the curved section of the rail via the exterior walls and configured for attaching the rail to the roof of a vehicle at a position apart from the end face of the rail, the support having an upper surface which is curved so as to be complementary to the lower surface of the curved section of the rail;
further comprising a mounting plate located between the support and the roof of a vehicle, and wherein the end face of the rail is disposed adjacent the mounting plate, and wherein the mounting plate has a projection disposed thereon, wherein the projection extends into a hollow interior of the end of the rail, and wherein the projection is complementary in shape to the interior of the rail so as to engage the interior surface of said exterior walls of the rail.

13. A roof rack for a vehicle comprising:
a rail extending at a distance from a vehicle, wherein the rail comprises an elongate body defined by exterior walls extending along the length thereof, an end face extending across the end of the rail, the end face being connected to the vehicle, and an elongate longitudinal section of the rail disposed adjacent the end of the rail, said longitudinal section being curved such that said longitudinal section of the rail curves towards the surface of a vehicle;

a support disposed apart from the end of the rail and attached to the underside of the longitudinal curved section of the rail via an exterior surface of said exterior walls of the rail, the support having a curved upper surface which is complementary to the lower surface of the curved section and the support having a lower surface attached to a vehicle apart from the end face, and wherein the rail has a recess formed in the exterior wall of the rail in the underside of the curved section, and wherein the support is located in the recess.

14. A roof rack for a vehicle comprising:

a rail extending at a distance from a vehicle, wherein the rail comprises an elongate body defined by exterior walls extending along the length thereof, an end face extending across the end of the rail, the end face being connected to the vehicle, and an elongate longitudinal section of the rail disposed adjacent the end of the rail, said longitudinal section being curved such that said longitudinal section of the rail curves towards the surface of a vehicle;

a support disposed apart from the end of the rail and attached to the underside of the longitudinal curved section of the rail via an exterior surface of said exterior walls of the rail, the support having a curved upper surface which is complementary to the lower surface of the curved section and the support having a lower surface attached to a vehicle apart from the end face, and wherein the rail has a step formed in the underside of the curved section, and wherein the support is disposed against the step.

15. A roof rack for a vehicle comprising:

a rail extending at a distance from a vehicle, wherein the rail comprises an elongate body defined by exterior walls extending along the length thereof, an end face extending across the end of the rail, the end face being connected to the vehicle, and an elongate longitudinal section of the rail disposed adjacent the end of the rail, said longitudinal section being curved such that said longitudinal section of the rail curves towards the surface of a vehicle;

a support disposed apart from the end of the rail and attached to the underside of the longitudinal curved section of the rail via an exterior surface of said exterior walls of the rail, the support having a curved upper surface which is complementary to the lower surface of the curved section and the support having a lower surface attached to a vehicle apart from the end face, and further comprising a mounting plate attached to the bottom of the support, and wherein the mounting plate has a projection configured for engaging a recess in the end face of the rail.

16. A roof rack for a vehicle comprising:

a rail extending at a distance from a vehicle, wherein the rail comprises an elongate body defined by exterior walls extending along the length thereof, an end face extending across the end of the rail, the end face being connected to the vehicle, and an elongate longitudinal section of the rail disposed adjacent the end of the rail, said longitudinal section being curved such that said longitudinal section of the rail curves towards the surface of a vehicle;

a support disposed apart from the end of the rail and attached to the underside of the longitudinal curved section of the rail via an exterior surface of said exterior walls of the rail, the support having a curved upper surface which is complementary to the lower surface of the curved section and the support having a lower surface attached to a vehicle apart from the end face, and wherein the rail has a tubular body defining a hollow interior, and wherein the roof rack has a mounting plate attached to the bottom of the support, the mounting plate having a projection extending upwardly therefrom having a shape which corresponds to the shape of the hollow interior of the rail and which extends into the hollow interior of the rail so as to engage the walls of said interior.

17. A roof rack for a vehicle comprising:

a rail extending at a distance from a vehicle, wherein the rail comprises an elongate body defined by exterior walls extending along the length thereof, an end face extending across the end of the rail, the end face being connected to the vehicle, and an elongate longitudinal section of the rail disposed adjacent the end of the rail, said longitudinal section being curved such that said longitudinal section of the rail curves towards the surface of a vehicle;

a support disposed apart from the end of the rail and attached to the underside of the longitudinal curved section of the rail via an exterior surface of said exterior walls of the rail, the support having a curved upper surface which is complementary to the lower surface of the curved section and the support having a lower surface attached to a vehicle apart from the end face, and wherein the bottom of the curved section and the top of the recess are curved in longitudinal cross-section and flat in lateral cross section.

18. The roof rack of claim 5, wherein the rail is formed by a single piece comprising a generally straight portion and said curved section.

19. The roof rack of claim 5, further comprising a mounting plate located between the support and the roof of a vehicle, and wherein the end face of the rail is disposed adjacent the mounting plate, and wherein the mounting plate has a projection disposed thereon, wherein the projection extends into a hollow interior of the end of the rail, and wherein the projection is complementary in shape to the interior of the rail so as to engage the interior surface of said exterior walls of the rail.

20. The roof rack of claim 7, further comprising a mounting plate located between the support and the roof of a vehicle, and wherein the end face of the rail is disposed adjacent the mounting plate, and wherein the mounting plate has a projection disposed thereon, wherein the projection extends into a hollow interior of the end of the rail, and wherein the projection engages the interior surface of said exterior walls of the rail.

21. The roof rack of claim 12, wherein the rail has a recess formed in the underside of the exterior wall of the curved section of the rail and wherein the support is disposed in the recess.

* * * * *